United States Patent Office 3,535,288
Patented Oct. 20, 1970

3,535,288
CATIONIC POLYAMIDE-EPICHLOROHYDRIN
RESINS
Stanley A. Lipowski, Livingston, and Arvid Christiansen, North Arlington, N.J., assignors to Diamond Shamrock Corporation, Cleveland, Ohio, a corporation of Delaware
No Drawing. Filed Apr. 30, 1968, Ser. No. 725,494
Int. Cl. C08g 20/38
U.S. Cl. 260—78                                          3 Claims

ABSTRACT OF THE DISCLOSURE

Cationic polyamide-epichlorohydrin thermosetting resins are the reaction products of epichlorohydrin and polyamides, the latter being reaction products of amino polycarboxylates having from three to four —COO— groups with polyalkylene polyamines. These resins are used in the manufacture of wet-strength paper. Useful resins are prepared by reacting nitrilotriacetic acid and pentaethylenehexamine to obtain polyamides which are then reacted with epichlorohydrin.

BACKGROUND OF THE INVENTION

This invention relates to improved cationic polyamide-epichlorohydrin thermosetting resins, their preparation and use in the manufacture of paper having improved wet-strength.

Cationic polyamide-epichlorohydrin resins have been prepared by reaction of dicarboxylic acids such as aliphatic dicarboxylic acids with polyalkylene polyamines followed by reaction with epichlorohydrin and have been used in the manufacture of paper to improve wet-strength. The advantage of these resins is that they impart wet-strength to paper regardless of whether the paper is produced under acid, neutral or alkaline conditions. Although these cationic resins have been used extensively in paper manufacture, there is a need for cationic resins which are more efficient and produce paper having improved wet-strength at a lower cost. A variety of types of resins derived from epichlorohydrin have been proposed for use as wet-strength resins in the manufacture of paper, but none appears to have enjoyed the commercial acceptance which cationic polyamide-epichlorohydrin resins based on aliphatic dicarboxylic acids have. Sales of polyamide-epichlorohydrin resins based on saturated aliphatic dibasic carboxylic acids containing from three to ten carbon atoms for use in the manufacture of paper attained a volume of seventy million pounds in 1964. Improved cationic polyamide-epichlorohydrin resins for use in paper making would be of considerable benefit to the industry.

It is the object of this invention to provide improved cationic polyamide-epichlorohydrin resins for use as wet-strength resins in paper making. Another object is to provide processes for producing these improved cationic resins. A further object is to provide paper making processes using these resins to produce paper having improved wet-strength. Still another object is to provide paper treated with these resins which has improved wet-strength. Other objects will become apparent from the detailed description given herein. It is intended, however, that the detailed description and specific examples given herein do not limit this invention but merely illustrate preferred embodiments thereof.

SUMMARY OF THE INVENTION

Resins, which are useful in the manufacture of paper to improve the wet-strength of the paper, are cationic polyamide-epichlorohydrin thermosetting resins. They are reaction products of epichlorohydrin and polyamides, which are the reaction products of amino polycarboxylates having from three to five —COO— groups and polyalkylene polyamines. The amino polycarboxylates are nitrilotriacetic acid, ethylenediaminetetraacetic acid, N-(2-hydroxyethyl)-ethylenediaminetriacetic acid, diethylenetriaminepentaacetic acid, 1,2-diaminocyclohexanetetraacetic acid, esters of the above acids with monohydric alcohols having from about one to about six carbon atoms, ammonium salts of the above acids, substituted ammonium salts of the above acids and mixtures thereof with the proviso that when the amino polycarboxylate contains four —COO— groups, one —COO— group can be in the form of an alkali metal salt and with the proviso that when the amino polycarboxylate contains five —COO—groups, up to two —COO— groups can be in the form of an alkali metal salt, while the polyalkylene polyamines have the formula,

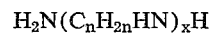

$$H_2N(C_nH_{2n}HN)_xH$$

where $n$ is at least two and $x$ is at least two. The polyamide is a reaction product wherein the polyalkylene polyamine and amino polycarboxylate are present in amounts sufficient to provide from about 0.5 to about 1.5 primary amine groups present in said polyamine for each —COO— group present in said polycarboxylate so that substantially all of the reaction is between the primary amine groups present in the polyamine and the —COO— groups present in the polycarboxylate and little, if any, reaction occurs between the secondary amine group and the —COO— groups. The secondary amine groups present in the polyamine remain essentially unreacted since the primary amine groups preferentially react with the —COO— groups. The desired cationic thermosetting resin is then obtained by reacting from about 0.5 to about 1.2 moles of epichlorohydrin with each secondary amine group present in the polyamide.

Cationic thermosetting resins of this invention are produced by (A) reacting together (1) at least one of the abovementioned amino polycarboxylates and (2) at least one of the abovementioned polyalkylene polyamines at a temperature of from about 150 to about 220° C. in amounts sufficient to provide from about 0.5 to about 1.5 primary amine groups present in said polyamine for each —COO— group present in said polycarboxylate. Under the conditions of reaction, reaction occurs between the primary amine groups present in the polyamine and the —COO— groups present in the polycarboxylate. The secondary amine groups present in the polyamine remain essentially unreacted. Thus, a polyamide is formed which is thereafter (B) reacted with epichlorohydrin at a temperature of from about 65 to about 105° C. using from about 0.5 to about 1.2 moles of epichlorohydrin for each secondary amine group present in the polyamide thereby forming the desired cationic thermosetting resin.

Wet-strength paper is produced by incorporating in paper during its manufacture from about 0.1 to about 5.0% by weight of the dry cationic thermosetting resins of the present invention based on the dry weight of the pulp present in the paper and thereafter curing the resins in the paper to a water-insoluble state thereby producing a wet-strength paper. The thermosetting resins in the paper can then be cured by heating the paper containing the resin at from about 80 to about 120° C. for from about 0.5 to about 30 minutes. Paper produced with the cationic resins of this invention by this process has improved wet-strength and the paper is superior to paper produced with a typical commercial cationic polyamide-epichlorohydrin resin based on an aliphatic dicarboxylic acid as described in the prior art.

The superiority of the cationic resins of the present invention is attributed in part to their chemical structures.

Polyamide resins derived from the aliphatic dicarboxylic acids having two —COO— groups used in the prior art formed linear polyamides and were reacted with epichlorohydrin to obtain substantially linear cationic resins. Formula (I) exemplifies the prior art type of linear polyamide structure obtained by reaction of a dicarboxylic acid having six carbon atoms with terminal primary amine groups present in two different polyalkylene polyamine moieties wherein a secondary amine group is attached to each primary amine group through a two carbon atom alkylene chain. The resin is obtained by reaction of this polyamide with epichlorohydrin. Reaction occurs at the secondary amine groups of the polyamine which are starred with an asterisk (*) in Formula (I)

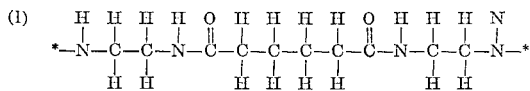

The resins of the present invention have more complex structures. When an amino polycarboxylate having three —COO— groups such as nitrilotriacetic acid is reacted with the same type of polyalkylene polyamide, a polyamide having a branched structure which can be characterized as a T-bone structure is obtained. Formula (II) exemplifies the T-bone structure of a polyamide obtained by reaction of nitrilotriacetic acid with terminal primary amine groups present in three different polyalkylene amine moieties wherein a secondary amine group is attached to each primary amine group through a two carbon atom alkylene chain. The desired resin is then obtained by reaction of this polyamide with epichlorohydrin at the secondary amine groups which are starred with an asterisk (*) in Formula (II)

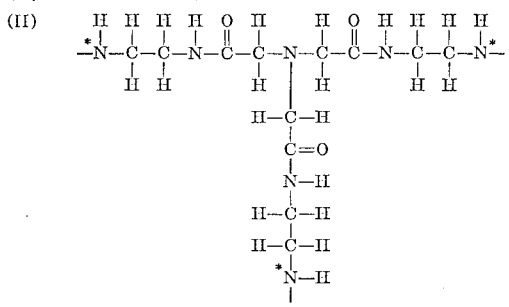

When an amino polycarboxylate having four —COO— groups such as ethylenediaminetetraacetic acid is reacted with the same type of polyalkylene polyamine, a polyamide having a branched structure which is characterized as a X-bone (crossbone) structure is obtained. Formula (III) exemplifies the X-bone structure obtained by reaction of ethylenediaminetetraacetic acid with terminal primary amine groups present in four different polyalkylene polyamine moieties wherein a secondary amine group is attached to each primary amine group through a two carbon atom alkylene group. The desired resin is obtained by reaction of this polyamide with epichlorohydrin at the secondary amine groups which are starred with an asterisk (*) in Formula (III)

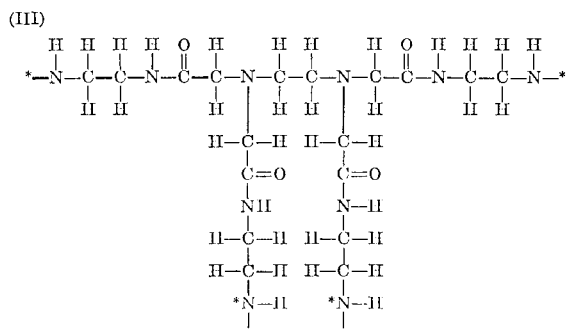

The superiority of the resins having the T-bone and X-bone structures shown in Formulas (II) and (III) above over the prior art resins having the linear structure shown in Formula (I) was completely unexpected. The prior art emphasized that dicarboxylic acids should be used to obtain water soluble linear polyamides and hence, water-soluble linear polyamideepichlorohydrin cationic resins. Further, it is well known in polymer art that branched polymers and branched resins have more complex structures and are more likely to be water insoluble. Consequently, it could not be predicted on the basis of the prior art that polyamide-epichlorohydrin resins containing polyamides prepared from amino polycarboxylates having from three to five —COO— groups and polyalkylene polyamines would be water soluble and would have outstanding properties as wet-strength resins for paper.

DESCRIPTION OF THE PREFERRED EMBODIMENTS

Polyamide-epichlorohydrin cationic resins of the present invention are derived from polyamides which in turn are reaction products of certain amino polycarboxylates and polyalkylene polyamines. Amino polycarboxylates useful in the preparation of these resins have from three to five —COO— groups with the proviso that when there are four —COO— groups in the polycarboxylate, one —COO— group can be in the form of an alkali metal salt and with the proviso that when the amino polycarboxylate contains five —COO— groups, up to two —COO— groups can be in the form of an alkali metal salt.

Useful amino polycarboxylates include nitrilotriacetic acid, ethylenediaminetetraacetic acid, N-(2-hydroxyethyl)-ethylenediaminetriacetic acid, diethylenetriaminepentaacetic acid, 1,2-diaminocyclohexanetetraacetic acid and the like. Esters of these acids can also be used. These esters include esters of the above acids with monohydric alcohols having from about one to about six carbon atoms such as the monomethyl ester of nitrilotriacetic acid, the diethyl ester of nitrilotriacetic acid, the trihexyl ester of nitrilotriacetic acid, the monoisopropyl ester of ethylenediaminetetraacetic acid, the diisobutyl ester of ethylenediaminetetraacetic acid, the tri-n-amyl ester of ethylenediaminetetraacetic acid, the tetramethyl ester of ethylenediaminetetraacetic acid, the monomethyl ester of N-(2-hydroxyethyl)-ethylenediaminetriacetic acid, the diethyl ester of diethylenetriaminepentaacetic acid, the pentamethyl ester of diethylenetriamine pentaacetic acid, the monoisopropyl ester of 1,2-diaminocyclohexanetetraacetic acid and the like.

Ammonium salts such as the monoammonium salt of nitrilotriacetic acid, the diammonium salt of nitrilotriacetic acid, the triammonium salt of nitrilotracetic acid the tetraammonium salt of ethylenediaminetetraacetic acid, the triammonium salt of N-(2-hydroxyethyl)-ethylenediaminetriacetic acid, the pentaamonium salt of diethylenetriaminepentaacetic acid and the like can be used. The corresponding substituted ammonium salts of the above-mentioned acids can also be used. Substituted ammonium salts of the abovementioned acids include those derived from monomethylamine, diethylamine, triisopropylamine, mono-n-butylamine, mono-n-hexylamine, cyclohexylamine and the like. When an amino polycarboxylate containing four —COO— groups is used, one —COO— group can be in the form of an alkali metal salt and when a polycarboxylate containing five —COO— groups is used, up to two —COO— groups can be in the form of an alkali metal salt. Alkali metal salts such as the monosodium salt of ethylenediaminetetraacetic acid, the monopotassium salt of ethylenediaminetetraacetic acid, the monolithium salt of ethylenediaminetetraacetic acid, the monosodium salt of diethylenetriaminepentaacetic acid, the dipotassium salt of diethylene triaminepentaacetic acid and the like can be used. Mixtures of these acids, esters and salts can be used as well as compounds such as the monosodium monoammonium salt of the monomethyl ester of diethylenetriaminepentaacetic acid and the like. The above amino polycarboxylates have been used extensively in industrial applications as organic sequestering agents and are well known articles of commerce.

Polyalkylene polyamines useful in the present invention may be represented by the formula:

$$NH_2(C_nH_{2n}HN)_xH$$

where $n$ is at least two and $x$ is at least two and preferably where $n$ is from about two to about six and $x$ is from about two to about eight. Polyalkylene polyamines useful in this invention include polyamines containing two primary amine groups and at least one secondary amine group in which the nitrogen atoms are linked together by alkylene chains which can be groups of the formula $-C_2H_{2n}-$ where $n$ is at least two and the number of alkylene chains can be from about two to about eight and preferably from about four to about six. The nitrogen atoms can be attached to adjacent carbon atoms in the alkylene chain or group $-C_2H_{2n}-$ or to carbon atoms further apart but not to the same carbon atom. Useful polyalkylene polyamines include polyethylene polyamines, polypropylene polyamines, polybutylene polyamines and the like. Polyethylene polyamines are a particularly useful class. Examples of polyamines are diethylene triamine, triethylenetetraamine, tetraethylenepentaamine, dipropylenetriamine, pentaethylenehexamine and the like, in purified form as well as their mixtures. Various crude polyamines obtained from the reaction of ammonia and ethylene dichloride and refined only to the extent that chlorides, water, excess ammonia, and ethylenediamine are removed are very satisfactory materials. Preferred polyamines include polyethylene polyamines having from about four to about seven ethylene groups, two primary amine groups and from about two to about five secondary amine groups. The term polyalkylene polyamine as used herein refers to and includes any of the above-mentioned polyalkylene polyamines as well as mixtures thereof.

Amino polycarboxylates are reacted with polyalkylene polyamines to obtain polyamides. The polycarboxylates and polyamines are reacted in amounts sufficient to provide for from about 0.5 to about 1.5 primary amine groups present in the polyalkylene polyamine for each $-COO-$ group present in the polycarboxylate, preferably from about 0.8 to about 1.2 primary amine groups for each $-COO-$ group. That is, the quantity of amino polycarboxylate and polyamine are sufficient that substantially all of the reaction is between primary amine groups present in the polyalkylene polyamine and the $-COO-$ groups and essentially none of the secondary amine groups present in the polyamine react with the $-COO-$ groups. In this way, the secondary amine groups present in the polyamine remain unreacted.

Amino polycarboxylates and polyalkylene amines are reacted in the above ratios to obtain water soluble polyamides having the T-bone and/or X-bone structures described in Formula II and Formula III above. Reaction temperatures of from about 150 to about 220° C. or higher at atmospheric pressure can be used in the reaction of polycarboxylates and polyamines to obtain polyamides with reaction temperatures of from about 170 to about 200° C. being preferred. Since water and other volatile materials such as alcohol, ammonia, amines or the like are eliminated during this reaction, lower reaction temperatures can be used when reaction is carried out subatmospheric pressures rather than atmospheric pressure. Reaction times usually vary from about 0.5 to about 10 hours when reaction is carried out at atmospheric pressures using the abovementioned temperature ranges. These reaction conditions and reaction times are representative of reactions wherein reaction between the polycarboxylate and polyamine is continued until reaction is substantially complete. Longer or shorter reaction times can be obtained by varying the abovementioned reaction conditions.

Polyamides obtained by the above reaction are then reacted with epichlorohydrin to convert the polyamides into cationic polyamide-epichlorohydrin resins. Sufficient epichlorohydrin is used to convert part or all of the secondary amine groups present in the polyamide to tertiary amine groups. When desired, the reaction rate can be moderated or increased by using more or less epichlorohydrin. From about 0.5 mole to about 1.2 moles of epichlorohydrin for each secondary amine group present in the polyamide can be used with the preferred quantities of epichlorohydrin being from about 0.5 mole to about 1.0 mole for each secondary amine group present in the polyamide. Reaction of the polyamide with epichlorohydrin is carried out in aqueous solution at a temperature of from about 65 to about 105° C. with the preferred temperatures being from about 65 to about 85° C. An aqueous solution is used to moderate the reaction. It may not be necessary to adjust the pH of the reaction mixture during reaction. However, pH of the mixture decreases during reaction and it may be desirable in some cases to add alkali to neutralize part of the hydrochloric acid formed during the reaction of the polyamide with epichlorohydrin.

After reaction is substantially complete and the desired product is obtained, the solids content of the aqueous resin solution is then adjusted to the desired concentration, e.g., about 10% by weight. The resulting solution is cooled to about 25° C. and stabilized by adjusting the pH of the solution to about 5 to about 6 with the preferred pH being about 5 or lower. The pH is usually adjusted by adding an acid such as hydrochloric acid, sulfuric acid, nitric acid, formic acid, acetic acid, phosphoric acid or the like with hydrochloric acid being the preferred acid.

The cationic polyamide-epichlorohydrin resins of this invention are used in paper-making to increase the wet-strength of paper. These cationic resins can be applied to paper or other felted cellulosic products by beater, tub, spray application or the like. A preferred method of incorporating these resins in paper is internal addition of the resin to the pulp prior to sheet formation to take advantage of the substantivity of the cationic resins for hydrated cellulosic fibers. In practicing this method of application, an aqueous solution of the cationic resin in its uncured and hydrophilic state is added to an aqueous suspension of paper stock in the beater, stock chest, Jordan engine, fan pump, head box or other suitable point before sheet formation. From about 0.1 to about 5.0% by weight of dry resins based on the weight of dry pulp, that is, about 0.1 to about 5.0 parts by weight of dry resins based on 100 parts by weight of dry pulp are added to the aqueous suspension of paper stock. The quantity of resins added to the aqueous stock suspension will depend on the degree of wet-strength desired in the finished paper and on the amount of resins retained by the paper fibers. Paper sheet is then formed from the paper stock containing the resins and heated at about 80 to about 180° C. for from about 0.5 to about 30 minutes to cure the resins in the paper to a polymerized water-insoluble state which imparts wet-strength to the paper sheet.

These resins can also be applied to preformed, partially or completely dried paper by spraying, impregnating, immersing, coating or other suitable methods for application of aqueous solutions of these resins in paper making. The abovementioned quantities of dry resins based on 100 parts by weight of dry pulp in the paper can be used in these applications and the resulting treated paper can be heated at from about 80 to about 120° C. for from about 0.5 to about 30 minutes to dry the paper and cure the resins in the paper to a water-insoluble state.

The uncured cationic thermosetting resins of this invention are incorporated in paper by any suitable method such as the procedures described above and are cured under acid, neurtal or alkaline conditions, e.g., at a pH of from about 4.0 to about 10 by subjecting the treated paper to heat at from about 80 to about 120° C. for from about 0.5 to about 30 minutes. One advantage of these resins is that optimum results can be achieved under the neutral or alkaline application and curing conditions which exist in paper making. Since extensive corrosion of equipment occurs under acid conditions, e.g., at a pH below 6.0 it is an advantage in that acid conditions are not required. That is, the application of the resin to the pulp and its curing can be achieved at a pH of from about 6.0 to about 10.0, e.g., at a pH of 8.0 to 0.5, depending upon the pH of the pulp. Paper produced with these resins has greatly improved wet-strength. The resins can be used to improve wet-strength properties of paper towels, absorbent tissues and the like as well as heavier stocks such as wrapping paper, bag paper and the like.

It is to be understood that although reference has heretofore been made to water soluble polyamides and water soluble polyamide-epichlorohydrin resins, this invention also contemplates water dispersible polyamide-epichlorohydrin resins which can be obtained from either water soluble or water dispersible polyamides.

For a fuller understanding of the nature and objects of this invention, reference may be made to the following examples. These examples are given merely to illustrate the invention and are not to be construed in a limiting sense. All parts, proportions, percentages and quantities are by weight unless otherwise indicated. The terms g., cc. and ° C. are used to indicate grams, cubic centimeter and degrees centigrade respectively in these examples.

EXAMPLE I

Preparation of a cationic polyamide-epichlorohydrin resin 58.4 g. (0.2 mole) of ethylenediaminetetraacetic acid, 70.0 g. (0.3 mole) of pentaethylenehexamine and 36.0 cc. of water were charged into a glass flask equipped with agitator, water trap, reflux condenser and thermometer. The reaction mixture was rapidly agitated to assure thorough mixing. Temperature of the reaction mixture rose from about 25° C. to about 85° C. during mixing. External heat was then applied with vigorous agitation. After about 25 minutes of heating with vigorous agitation, the temperature of the reaction mixture reached 119° C. where reflux began. As soon as reflux began, water collected in the water trap where it was recovered and removed from the reaction mixture. The temperature of the reaction mixture rose as water was removed. After heating for one hour, 37 cc. water were trapped and removed from the reaction mixture and the reaction mixture reached 170° C., the maximum reaction temperature. Reaction between ethylenediaminetetraacetic acid and pentaethylene hexamine was substantially complete at this point with the resulting reaction product being the polyamide of ethylenediaminetetraacetic acid and pentaethylenehexamine. The polyamide was cooled to about 150° C. and dissolved in 225 cc. of water to obtain an aqueous polyamide solution. The resulting aqueous solution was filtered to remove 6.5 g. of an insoluble gel which contained 0.8 g. of solids dry basis. Sufficient water was added to the filtered solution to adjust the weight of the solution of 410 g. and the polyamide content of the solution to 29.3% by weight. 0.75 primary amine groups present in the hexamine were reacted with each —COO— group present in the tetraacetic acid to obtain the polyamide.

205 g. of the 29.3% by weight polyamide solution and 115 cc. of water were charged into a glass flask equipped with agitator, reflux condenser and thermometer and heated to 65° C. with agitation. 37 g. (0.4 mole) of epichlorohydrin, which represented 0.67 mole of epichlorohydrin per secondary amine group present in the polyamide, was added. Addition of epichlorohydrin to the polyamide solution required thirty minutes and the temperature of the reaction mixture rose to 68° C. at the end of the addition. The resulting reaction mixture was slowly heated with agitation to about 73° C. over one hour and then heated to about 83° C. over 15 minutes. The reaction mixture was agitated for an additional 25 minutes at which time the viscosity of the reaction mixture increased rapidly and the final reaction temperature of 84° C. was reached. 400 cc. of cold water was then added to the reaction mixture to obtain an aqueous solution of the cationic polyamide-epichlorohydrin resin, the desired reaction product. The resulting resin solution had a pH of 5.6 as is and contained 13.0% by weight of the resin. This solution was diluted with additional water to obtain a clear reddish brown solution containing 10.0% by weight of the desired cationic polyamide-epichlorohydrin resin.

EXAMPLE II

Preparation of a cationic polyamide-epichlorohydrin resin 38.2 g. (0.2 mole) of nitrilotriacetic acid, 57 g. (0.3 mole) of tetraethylenepentamine and 50 cc. of water were mixed and reacted in accordance with the procedure given in Example I above. The reaction mixture was heated to 180° C. 57 cc. of water were collected in the water trap and removed from mixture duing reaction. The reaction product, the polyamide of nitrilotriacetic acid and tetraethylenepentamine was cooled to about 150° C., dissolved in 150 cc. of water and filtered to obtain a dark amber solution containing 36% by weight of the polyamide. 1.00 primary amine groups present in the pentamine were reacted with each —COO— group present in the triacetic acid to obtain the polyamide.[1]

238 g. of the 36% by weight polyamide solution and 260 cc. of water were charged to a glass flask equipped with agitator, reflux condenser and thermometer. 46.3 g. (0.5 mole) of epichlorohydrin, which represented 0.56 mole of epichlorohydrin per secondary amine group present in the polyamide, was added to the polyamide solution over 45 minutes. The epichlorohydrin and polyamide reaction mixture was agitated for two hours at 75° C. at which time the viscosity of the reaction mixture increased rapidly. Sufficient cold water was added to the reaction mixture to obtain a 10% by weight aqueous solution of the cationic polyamide-epichlorohydrin resin, the desired reaction product in the form of a clear reddish-brown aqueous solution. The pH of the 10% aqueous solution of resin was 6.0 as is.

EXAMPLE III

Preparation of a cationic polyamide-epichlorohydrin resin 38.2 g. (0.2 mole) of nitrilotriacetic acid, 32.6 g. (0.316 mole) of diethylenetriamine and 20 cc. of water were mixed and reacted in accordance with the procedure given in Example I above. After 1.5 hours of reaction, 25 cc. of water were removed and the maximum reaction temperature of 185° C. was reached. The resulting reaction product, the polyamide of nitrilotriacetic acid and diethylenetriamine was cooled to 32° C., dissolved in 130 cc. of water and filtered to obtain a solution containing 32% by weight of the polyamide. 1.05 primary amine groups present in the triamine were reacted with each —COO— group present in the triacetic acid to obtain the polyamide.

190 g. of the 32% by weight polyamide solution was charged to a glass flask equipped with agitator, reflux

---

[1] Analysis of the polyamide solution in accordance with A.O.C.S. Tentative Method N-b-4-62, entitled Primary, Secondary and Tertiary Amine Values of Fatty Amines, indicated that all primary amine groups present in the hexamine reacted during the polyamide reaction while essentially no secondary amine groups reacted.

condenser and thermometer. 28 g. (0.3 mole) of epichlorohydrin, which represented 0.95 mole of epichlorohydrin per secondary amine group present in the polyamide, was added to the aqueous polyamide solution over 42 minutes. The reaction mixture was externally heated, agitated and reacted for five hours to obtain the desired cationic polyamide-epichlorohydrin resin. The maximum temperature during reaction was 78° C. When reaction was complete, the reaction product was diluted with 400 cc. of water to obtain a clear amber solution having a pH of 4.8 as is and containing 15% by weight of the desired cationic polyamide-epichlorohydrin resin.

EXAMPLE IV

Preparation of a cationic polyamide-epichlorohydrin resin

To 524 g. of an aqueous solution containing 32.5 g. (0.0826 mole) of diethylenetriaminepentaacetic acid in water was added to 46.4 g. (0.2 mole) of pentaethylenehexamine. This mixture was reacted by the procedure described in Example I above to obtain the polyamide of diethylenetriaminepentaacetic acid and pentaethylenehexamine. A maximum temperature of 200° C. was reached during the polyamide reaction and the resulting reaction product, the polyamide reaction product had a syrupy consistency. Water was added slowly and cautiously to the hot reaction product. The polyamide dissolved easily. Sufficient water was added to obtain 340 g. of polyamide solution. The polyamide was the reaction product of 0.97 primary amine groups present in the hexamine with each —COO— group present in the pentaacetic acid.[2]

170 g. of the aqueous polyamide solution which was the reaction product of 0.041 mole of the pentaacetic acid and 0.1 mole of the hexamine and contained 0.4 secondary amine groups, was charged to a glass flask equipped with agitator, reflux condenser and thermometer. The polyamide solution was heated to 65° C. with agitation. 25.5 g. (0.28 mole) of epichlorohydrin, which represented 0.7 mole of epichlorohydrin per secondary amine group present in the polyamide, was slowly added with agitation to the polyamide solution. The temperature of the reaction mixture rose to 80° C., 25 minutes after completion of the epichlorohydrin addition and the reaction mixture became very viscous. 300 cc. of cold water was added to the reaction mixture. Temperature of the reaction mixture dropped to 45° C.

The reaction mixture was then heated to 65° C. and reacted with agitation at 65° C. for 15 minutes. 300 cc. of cold water was then added to the reaction mixture to obtain an aqueous solution of the cationic polyamide-epichlorohydrin resin, the desired reaction product. This solution had a pH of 7.0 as is. 9 cc. of concentrated hydrochloric acid was added to adjust the pH of the resin solution to 4.0. The resulting resin solution contained 7.5% by weight of the desired polyamide-epichlorohydrin resin.

EXAMPLE V

Preparation of a cationic polyamide-epichlorohydrin resin 344 g. of an aqueous solution containing 9.3 g. (0.0334 mole) of N-(2-hydroxyethyl)-ethylenediaminetriacetic acid in water was reacted with 11.6 g. (0.05 mole) of pentaethylenehexamine using the procedure described in Example I above to obtain the polyamide of N-(2-hydroxyethyl)-ethylenediaminetriacetic acid and pentaethylenehexamine. The maximum temperature during the polyamide reaction was 185° C. The resulting polyamide had a syrupy consistency. 80 cc. of cold water was added to the mixture to dissolve the polyamide and obtain a clear aqueous solution of the polyamide. 1.0 primary amine groups present in the hexamine were reacted with each —COO— group present in the triacetic acid to obtain the polyamide.

100 g. of the aqueous polyamide solution, which was the reaction product of 0.0334 mole of the triacetic acid and 0.05 mole of the hexamine and contained 0.2 secondary amine groups, was charged to a glass flask equipped with agitator, reflux condenser and thermometer. This polyamide solution was heated with agitation to 65° C. 14 g. (0.15 mole) of epichlorohydrin, which represented 0.75 mole of epichlorohydrin per secondary amine group present in the polyamide, was slowly added with agitation to the polyamide solution. Temperature of the reaction mixture rose to 76° C. 18 minutes after completion of the epichlorohydrin addition. The reaction mixture was agitated at about 76° C. for 45 minutes, then heated with agitation to 84° C. and held at 84° C. for three hours to obtain an aqueous solution of the cationic polyamide-epichlorohydrin resin, the desired reaction product. This solution was diluted to a total weight of 300 g. and had a pH of 5.4 as is. The pH of the aqueous solution was adjusted to 4.6 as is by the addition of 1 cc. of concentrated hydrochloric acid to obtain a clear aqueous solution containing 11% by weight of the desired cationic polyamide-epichlorohydrin resin.

EXAMPLE VI

Preparation of a cationic polyamide-epichlorohydrin resin 29.2 g. (0.1 mole) of ethylenediaminetetraacetic acid was dispersed in 60 g. of water in a glass flask equipped with agitator, water trap, reflux condenser and thermometer. 8.0 g. (0.1 mole) of 50% by weight aqueous sodium hydroxide solution was added to the dispersion of tetraacetic acid in water. The resulting mixture was agitated for five minutes at about 25° C. to convert the ethylenediaminetetraacetic acid to the corresponding monosodium salt in the form of an aqueous solution. 34.8 g. (0.15 mole) of pentaethylenehexamine was added to the aqueous solution of the monosodium salt of ethylenediaminetetraacetic acid. This reaction mixture was reacted by the procedure described in Example I above to obtain the polyamide of the monosodium salt of ethylenediaminetetraacetic acid and pentaethylenehexamine. The reactants were heated to reflux. Water was collected in the water trap where it was recovered and removed from the reaction mixture. After seventy minutes of reflux, the reaction temperature was 163° C. A total of 63 cc. of water had been removed from the reaction mixture at this point. Vacuum was applied to the reaction mixture to remove an additional 3.5 cc. of water and then the vacuum was released. 200 cc. of water was added slowly and cautiously to the reaction product to obtain 265 g. of an aqueous polyamide solution. The polyamide was the reaction product of 0.75 primary amine groups present in the hexamine with each —COO— group present in the tetraacetic acid.

66 g. of the aqueous polyamide solution, which was the reaction product of 0.025 mole of the tetraacetic acid and 0.0375 mole of the hexamine and contained 0.15 secondary amine groups, was charged into a glass flask equipped with agitator, reflux condenser and thermometer. The polyamide solution was heated to 65° C. with agitation. 10 g. (0.108 mole) of epichlorohydrin, which represented 0.72 mole of epichlorohydrin per secondary amine group present in the polyamide, was slowly added over 16 minutes to the agitated polyamide solution. Temperature of the reaction mixture rose to 72° C. The mixture was reacted with agitation for one hour at 72° C., and then heated with agitation to 84° C. 2 g. of 50% by weight aqueous sodium hydroxide solution was added to neutralize part of the hydrochloric acid formed during the reaction. This mixture was reacted at 84° C. with agitation for an additional two hours. At this point, the reaction mixture became quite viscous and reaction was substantially complete. 175 cc. of water was added to the reaction product to obtain an aqueous solution of the cationic polyamide-

---

[2] Analysis of the polyamide solution in accordance with A.O.C.S. Tentative Method N–b–4–62, entitled Primary, Secondary and Tertiary Amine Values of Fatty Amines, indicated that all primary amine groups present in the hexamine reacted during the polyamide reaction while essentially no secondary amine groups reacted.

epichlorohydrin resin, the desired reaction product. This solution had a pH of 6.15. 5.3 g. of concentrated hydrochloric acid was added to adjust the pH of the solution to 4.5 as is and to obtain the final product, an aqueous solution containing 11% by weight of the cationic polyamide-epichlorohydrin resin.

Table I below summarizes the relationships of the various reactants and their functional groups in the cationic resins of Examples I through VI.

EXAMPLE VII

Evaluation of the cationic polyamide-epichlorohydrin resins of Example I through Example VI Handsheets of paper were prepared using 100 ml. of 2% consistency unbleached kraft pulp (2 g. dry weight) with and without 1 ml. of a 1% by weight solution of the cationic polyamide epichlorohydrin resins of Example I through Example VI, that is, 0.5% by weight of dry resin based on the weight of dry pulp. These quantities of pulp and resin solutions were mixed together to obtain mixtures of pulp and resin which were found to have a pH of 8.0±0.5. The resulting mixture was diluted with water to a volume of 500 ml., agitated and poured into a 6″ diameter Buchner funnel equipped with a 100 mesh wire screen. Suction was applied to Buchner funnel to remove water from the diluted pulp mixture so that a paper handsheet was formed on the wire screen. The wire screen having the formed wet handsheet thereon was removed from the Buchner funnel, placed on blotters and pressed to remove excess water. The handsheet was then removed from the wire screen, air-dried and heated in an oven at 105° C. for ten minutes to dry the sheet and cure the resin present in the sheet. Handsheets were also prepared by this procedure using a typical commercial cationic polyamide-epichlorohydrin resin of the prior art which was the reaction product of epichlorohydrin and the polyamide of adipic acid and diethylene-triamine of the prior art.

Samples of the above cured handsheets were tested according to TAPPI test procedures T 456 m–49 and T 404 ts–66. The wet tensile strengths (lbs./in.) obtained using these tests are shown in Tables II, III and IV below. The term, Blank in these tables indicates results obtained with paper handsheets which did not contain resin, Prior Art Resin indicates results obtained with paper handsheets which contain the typical commercial resin of the prior art described above and Example I through Example VI indicate results obtained with paper handsheets which contain the particular cationic resin described in the indicated example in the present application.

TABLE II

| Sample: | Wet tensile strength lbs./in. |
|---|---|
| Blank | 0.65 |
| Prior art resin | 5.20 |
| Example I | 5.80 |

TABLE III

| Sample: | Wet tensile strength lbs./in. |
|---|---|
| Blank | 0.80 |
| Example II | 6.30 |
| Example III | 5.90 |

TABLE IV

| Sample: | Wet tensile strength lbs./in. |
|---|---|
| Blank | 0.70 |
| Example IV | 6.40 |
| Example V | 6.40 |
| Example VI | 5.50 |

The foregoing data demonstrates the superiority of the resins of Example I through VI, over the linear prior art resin.

What is claimed is:

1. A cationic polyamide-epichlorohydrin thermosetting resin which is the reaction product of
 (A) a polyamide which is the reaction product of
  (1) at least one amino polycarboxylate selected from the group consisting of nitrilotriacetic acid, ethylenediaminetetraacetic acid, N-(2-hydroxyethyl)ethylenediaminetriacetic acid, diethylenetriaminepentaacetic acid, 1,2 - diaminocyclohexanetetraacetic acid, their esters of monohydric alcohols having from about one to about six carbon atoms, their ammonium salts, their substituted ammonium salts and mixtures thereof with the proviso that when said polycarboxylate has four —COO— groups, one —COO— group can be in the form of an alkali metal salt and with the proviso that when said polycarboxylate has five —COO— groups, up to two —100— groups can be in the form of an alkali metal salt, and
  (2) at least one polyalkylene polyamine of the formula, $$H_2N(C_nH_{2n}HN)_xH$$

where $n$ is at least two and $x$ is at least two, said polyamine and polycarboxylate being reacted together at temperatures between about 150° C. and about 220° C. and said polyamine and polycarboxylate being present in amounts sufficient to provide for from about 0.5 to about 1.5 primary amine groups present in said polyamine for each —COO— group present in said polycarboxylate so that substantially all of the reaction is between the primary amine groups present in said polyamine and the —COO— groups present in said polycarboxylate, and
 (B) epichlorohydrin, said polyamide and said epichlorohydrin being reacted together at temperatures between about 65° C. and about 105° C., said resin having from about 0.5 to about 1.2 moles of said

TABLE I

[Cationic resins of Examples I-VI]

| Resin of Example— | Polyalkylene polyamine | | | Amino polycarboxylate | | Epichlorohydrin moles present | Ratio of primary amine groups per —COO— group | Moles of epichlorohydrin per secondary amine group |
|---|---|---|---|---|---|---|---|---|
| | Moles present | Primary amine groups present | Secondary amine groups present | Moles present | —COO— groups present | | | |
| I | 0.15 | 0.30 | 0.60 | 0.10 | 0.40 | 0.40 | 0.75 | 0.67 |
| II | 0.30 | 0.60 | 0.90 | 0.20 | 0.60 | 0.50 | 1.00 | 0.56 |
| III | 0.316 | 0.63 | 0.316 | 0.20 | 0.60 | 0.30 | 1.05 | 0.95 |
| IV | 0.10 | 0.20 | 0.40 | 0.041 | 0.205 | 0.28 | 0.97 | 0.70 |
| V | 0.05 | 0.10 | 0.20 | 0.0334 | 0.10 | 0.15 | 1.00 | 0.75 |
| VI | 0.0375 | 0.075 | 0.15 | 0.025 | 0.10 | 0.108 | 0.75 | 0.72 | epichlorohydrin per secondary amine group present in said polyamide.

2. The resin of claim 1 wherein said polycarboxylate is ethylenediaminetetraacetic acid and said polyamine is pentaethylenehexamine.

3. The resin of claim 1 wherein said polycarboxylate is diethylenetriaminepentaacetic acid and said polyamine is pentaethylenehexamine.

References Cited

UNITED STATES PATENTS

| | | | |
|---|---|---|---|
| 2,926,154 | 2/1960 | Keim | 260—29.2 |
| 3,197,427 | 7/1965 | Schmalz | 260—29.2 |
| 3,240,761 | 3/1966 | Keim et al. | 260—78 |
| 3,250,664 | 5/1966 | Conte et al. | 162—164 |
| 3,320,215 | 5/1967 | Conte et al. | 260—78 |
| 3,442,754 | 5/1969 | Espy | 162—164 |

WILLIAM SHORT, Primary Examiner

H. SCHAIN, Assistant Examiner

U.S. Cl. X.R.

117—155; 162—164; 260—2.1, 29.2